(12) United States Patent
Sonti et al.

(10) Patent No.: US 6,859,440 B1
(45) Date of Patent: Feb. 22, 2005

(54) SERVICE PRIORITIZED ACCESS AND PAGING

(75) Inventors: Jagdish V. Sonti, Cupertino, CA (US); Bill A. Gage, Stittsville (CA); Shahid Rasul Chaudry, Winnipeg (CA); Risvan Coskun, Ottawa (CA); Goran G. Janevski, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 821 days.

(21) Appl. No.: 09/592,416

(22) Filed: Jun. 13, 2000

(51) Int. Cl.[7] .............................................. H04Q 7/00
(52) U.S. Cl. ...................... 370/252; 370/278; 370/329; 455/422
(58) Field of Search ................................ 370/252, 328, 370/329, 278, 311, 336, 347, 337, 442, 478, 412–418; 340/825.22; 379/57

(56) References Cited

U.S. PATENT DOCUMENTS 5,726,640 A * 3/1998 Jones et al. ............ 340/825.22
6,545,996 B1 * 4/2003 Falco et al. ................. 370/347

* cited by examiner

Primary Examiner—John Pezzlo

(57) ABSTRACT

A technique for prioritization of access and paging in cellular communications systems. In the downlink direction, where a single Paging Channel is configured, a plurality of queues are created corresponding to individual services or groups of services with the same priority. Page attempts are assigned to the appropriate queue according to a pre-determined service-to-queue mapping. Pages from the queues are sent on the Paging Channel in accordance with a pre-determined dequeuing algorithm. Where multiple Paging Channels are used, page attempts are assigned to the appropriate Paging Channel according to a pre-determined service-to-Paging Channel mapping. In the uplink direction, where a single Access Channel is configured, each mobile station includes in the Access Message a parameter representing the number of consecutive unsuccessful access attempts which have been initiated by the mobile station. This information is received by the base station and used to enable/disable services according to a predetermined priority. Which services are enabled/disabled is broadcast to each mobile station in the cell as a parameter in the Access Parameters Message. Mobile stations seeking to access services which have been disabled abandon their access attempts. Where multiple Access Channels are configured, services are mapped to the Access Channels according a pre-determined service-to-Access Channel mapping. Mobile stations initiate access attempts on the Access Channels as determined by the service-to-Access Channel mapping.

25 Claims, 11 Drawing Sheets

SERVICE PRIORITIZED ACCESS AND PAGING

The present invention relates generally to cellular communications systems, and more particularly to a method and apparatus for the prioritization of access and page attempts in third generation cellular communications systems.

BACKGROUND OF THE INVENTION

In Code Division Multiple Access (CDMA) systems, multiple, simultaneous users share radio resources through the use of unique, digital codes. CDMA is a form of spread-spectrum communications system, meaning that each channel shares the entire frequency spectrum. Interference between channels is maintained within acceptable limits through the use of orthogonal codes and strict power limits on transmitted signals.

CDMA has been implemented in cellular communications, examples of which are EIA/TIA standard IS-95, EIA/TIA standard IS-2000 (also known as cdma2000), and Universal Mobile Telecommunications Systems (UMTS).

The following discussion is based on the IS-95 and cdma2000 implementations of CDMA for cellular communications. It is to be recognized that this is merely exemplary of cellular implementations of CDMA systems, and that the invention is also applicable to cellular communications systems which are not CDMA based.

Cellular systems are comprised of a plurality of base stations interconnected by one or more switching systems. Each base station communicates with a number of mobile stations within a given geographical region known as a cell. The base station transmits data between its respective switching system and the mobile stations assigned to its cell. Communications from the base station to the mobile stations are over the forward or downlink channels. Conversely, communications from the a mobile station to its assigned base station are over the reverse or uplink channels.

Communications are initiated using shared uplink and downlink channels configured within the system. Typically, for base station-initiated communications, a Paging Channel is used. For mobile station-initiated communications, an Access Channel is used. Access channels are associated with specific Paging Channels. Under IS-95 and cdma2000, the forward CDMA channel may carry up to seven Paging Channels, and each Paging Channel may have up to thirty-two associated Access Channels.

The cdma2000 standard also supports Forward Common Control Channels in the downlink direction, and Enhanced Access Channels in the uplink direction which perform many of the same functions as the Paging Channels and the Access Channels when they are enabled. The discussion which follows uses the Paging Channel and Access Channel terminology.

The Access Channel is used by the mobile station to initiate communication with the base station and to respond to Paging Channel messages.

To initiate access, the mobile stations transmit on the Access Channel using a random access procedure. An access attempt consists of one or more access sub-attempts. In turn, each sub-attempt consists of a number of Access Sequences consisting of transmissions known as Access Probes. Each of the Access Probes consists of an Access Channel preamble and an Access Channel message capsule. The first Access Probe in an Access Sequence is transmitted at a specified initial power level relative to the nominal open-loop power level. Each subsequent Access Probe is transmitted at a power level that is a specified amount higher than the previous Access Probe.

After the transmission of each Access Probe, the mobile station waits for a specified period for an acknowledgement from the base station. If an acknowledgement is received, access is complete. If the acknowledgement is not received within the specified period of time, the mobile station continues with the rest of the Access Probes in sequence. All Access Probes within an Access Sequence are sent on the same Access Channel. If an Access Sequence does not succeed, the mobile station chooses a new Access Channel associated with the same Paging Channel by a PN randomization procedure, and sends the next Access Sequence of the access sub-attempt on the new Access Channel.

Most of the parameters of the random access procedure are provided by the base station to the mobile stations in the Access Parameters Message which is continuously transmitted on the Overhead Message Train.

Existing cellular systems conforming to the EIA/TIA cellular standards permit configuration of Access Overload Classes. Mobile stations are assigned to one (or more) of sixteen Overload Classes. The mobile station stores the class information in permanent memory. The base station controls which classes have access to the system by transmitting to the mobile stations the appropriate parameters for each Access Overload Class. The parameters are communicated to the mobile stations in the Access Parameters Message.

The EIA/TIA has defined the following Access Overload Classes: 0–9 for ordinary mobiles; 10 for test mobiles; 11 for emergency mobiles. The remaining Access Overload classes (12–15) are reserved.

The parameters relating to the Access Overload Classes as well as whether the Access Channel transmission is a registration, a message transmission or other transmission are used by the mobile stations to determine if and when they can initiate an Access Sequence as well as the delay between individual Access Sequences.

For incoming communications directed to a particular mobile station, the base station pages the mobile station using one of the Paging Channels configured within the system. The scheduling of pages is typically first-in, first-out.

The foregoing is specified and described in greater detail in the EIA/TIA standards IS-95 and IS-2000.

The IS-95 implementation of CDMA is what is known as a second generation communication system. Second generation communication systems are digital implementations which offer improved roaming capabilities over their analog predecessors. Other second generation communications systems include Global System for Mobile Communications (GSM), and Time Division Multiple Access (TDMA).

Third generation communications systems will be designed to provide global roaming, with high-speed data transmission. Examples of standards for third generation communication systems include Universal Mobile Telecommunications Systems (UMTS), and cdma2000. Third generation standards are still under development.

The deployment of third generation communications systems will result in an increase in the number of services that can be provided to cellular subscribers. The list of services includes, but is not limited to, voice, packet data, short message service, short data burst, and location management (registration). As traffic on communication networks increases, mobile stations using these services are forced to compete for resources including both the contention-based Access Channels and scheduled Paging Channels.

While existing third generation standards provide the limited ability to distinguish between classes of mobile stations which are accessing the system (through the Access Overload Classes), and between types of access attempts (registration versus message transmission versus other forms of transmissions), the standards do not provide a method for prioritization of the various services being used on the communications system. With all services being given equitable access to Access Channels and Paging Channels, cellular providers are not given the opportunity to distinguish between lower priority (e.g. less lucrative) and higher priority (e.g. more lucrative) services. In the result, the lower priority services acquire the system at the expense of the higher priority services.

In light of the foregoing, there is a need for a technique that permits cellular providers to prioritize access to system resources.

SUMMARY OF THE INVENTION

The present invention is directed to a method and apparatus for prioritization of access and paging in cellular communications systems.

In the uplink-direction, according to one embodiment, a single Access Channel is used. Each mobile station includes in the Access Message a parameter representing the number of consecutive unsuccessful access attempts which have been initiated by the mobile station (i.e. the collision rate). This information is received by the base station and used to enable/disable services according to a predetermined priority. Which services are enabled/disabled is incorporated as a parameter in the Access Parameters Message and broadcast to all mobile stations in the cell on the Overhead Message Train. Mobile stations seeking to access services which have been disabled abandon their access attempts.

According to another embodiment, multiple Access Channels are used. Services are mapped to the Access Channels according a pre-determined service-to-Access Channel mapping. Mobile stations initiate access attempts on the appropriate Access Channels as determined by the service-to-Access Channel mapping.

According to another embodiment, the service-to-Access Channel mapping is determined dynamically on the basis of system loading.

According to yet another embodiment, collision rates are used in conjunction with multiple Access Channels.

In the downlink direction, according to one embodiment, a single Paging Channel is used. A plurality of queues are created corresponding to individual services or groups of services with the same priority. Page attempts are assigned to the appropriate queue according to a pre-determined service-to-queue mapping. Pages from the queues are sent on the Paging Channel in accordance with a pre-determined dequeuing algorithm.

According to another embodiment, the page attempts are assigned to the various queues dynamically on the basis of the current state of the queues. The highest priority services are assigned to the least-loaded queue.

According to another embodiment, multiple Paging Channels are used. Page attempts are assigned to the appropriate Paging Channel according to a pre-determined service-to-Paging Channel mapping.

According to another embodiment, multiple Paging Channels are used. Page attempts are assigned to the various Paging Channels on the basis of system loading. The highest priority services are assigned dynamically to the least-loaded Paging Channel.

According to another embodiment, queues are used in conjunction with multiple Paging Channels.

According to yet another embodiment, page attempts are inhibited if the service sought to be accessed has been disabled.

Other aspects and features of the present invention will become apparent to those ordinarily skilled in the art upon review of the following description of specific embodiments of the invention in conjunction with accompanying figures.

DETAILED DESCRIPTION OF THE INVENTION

In the uplink direction, two embodiments will be discussed: a single Access Channel configuration and a multiple Access Channel configuration.

Figure 1A:
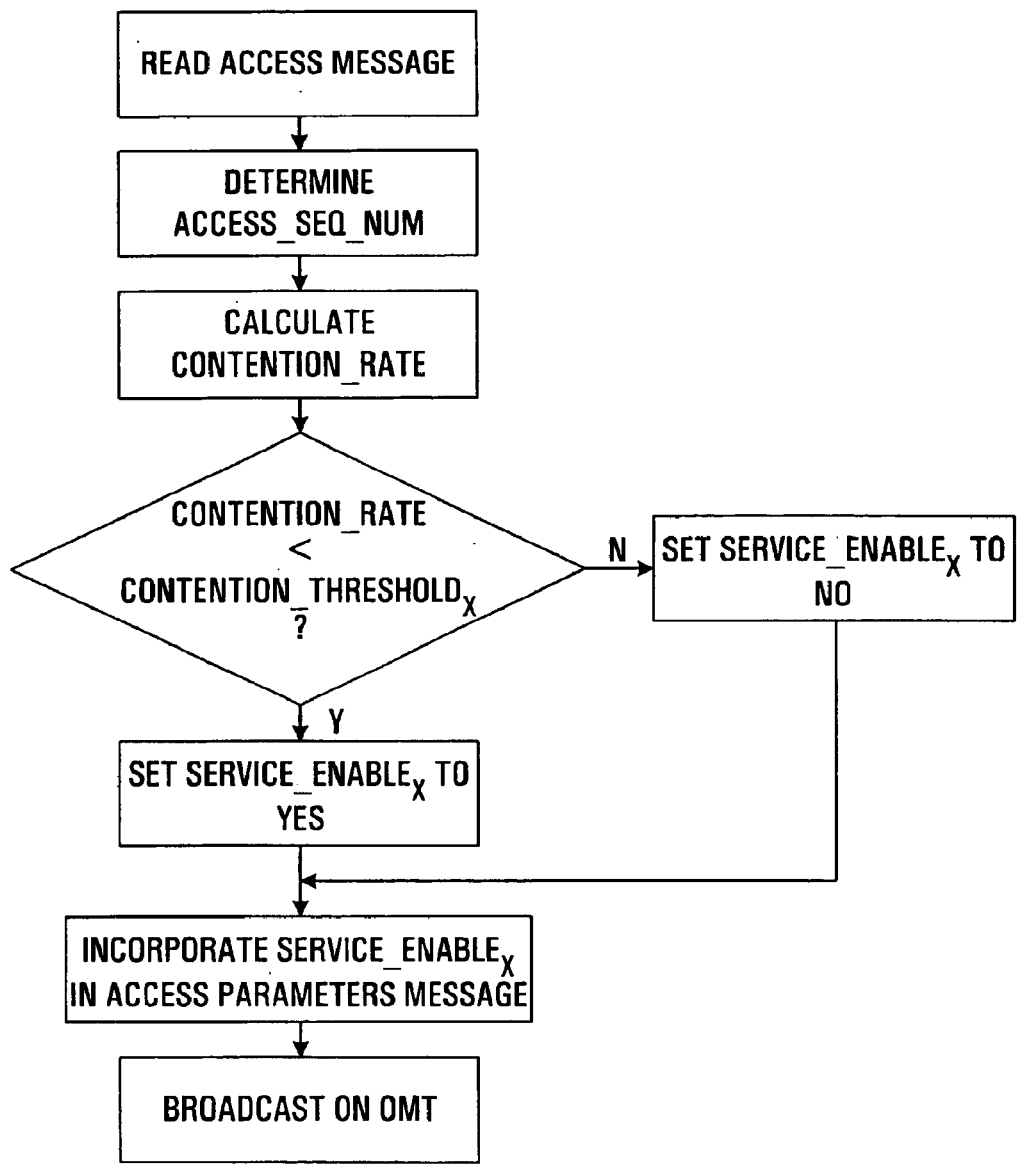
FIG. 1A is a flow-chart of the steps carried out at a base station for implementing a single Access Channel configuration in the uplink direction.
Figure 1B:
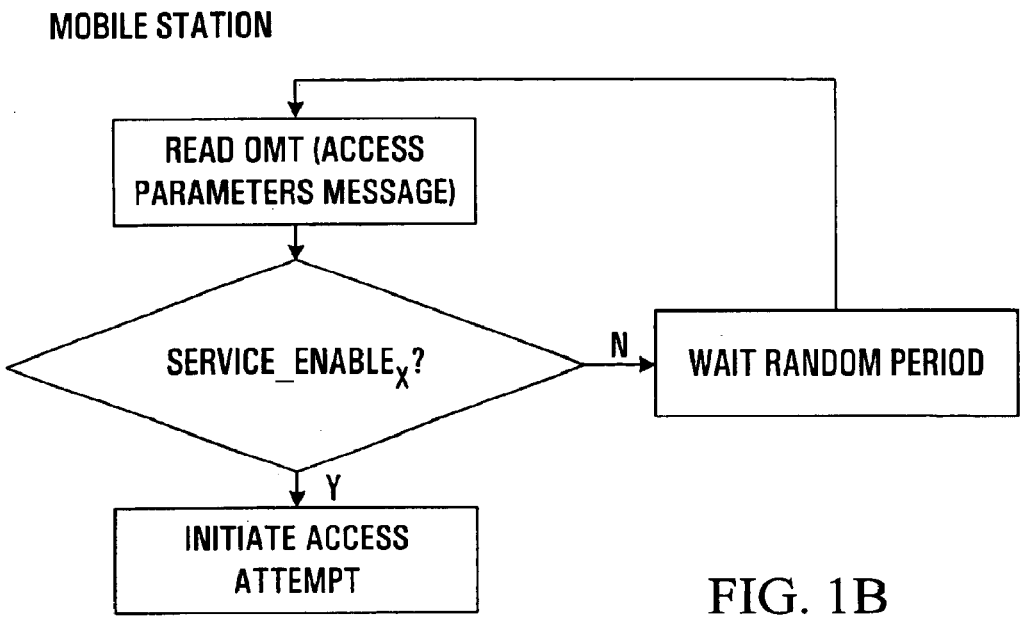
FIG. 1B is a flow-chart of the steps carried out at a mobile station for implementing a single Access Channel configuration in the uplink direction.

The procedure to be followed for mobile station-initiated communications in the single Access Channel configuration is depicted in FIGS. 1A and 1B. First the base station reads the Access Messages transmitted on the Access Channel and determines the value of a collision rate parameter representing the number of consecutive unsuccessful access attempts which have been initiated by the mobile stations seeking to initiate access. Illustratively, in CDMA cellular systems, the collision rate parameter can be calculated from the number of unsuccessful access sequences which have been initiated by the mobile stations (ACCESS_SEQ_NUM in the attached figures). The base station then establishes a contention rate, CONTENTION_RATE, for the system based upon the collision information received from all mobile stations. For each service X, the CONTENTION_RATE is compared to a predetermined contention rate threshold for the given service, $CONTENTION\_THRESHOLD_X$. If the contention rate exceeds the contention rate threshold for service X, the service parameter for that service, $SERVICE\_ENABLE_X$, is set to NO. Otherwise, $SERVICE\_ENABLE_X$ is set to YES. The service parameters are incorporated in the Access Parameters Message and broadcast to all mobile stations in the cell on the Overhead Message Train. Each mobile station reads the Access Parameters Message and stores in memory the value of the service parameters. Prior to initiating an access attempt, the mobile station checks the service parameter for the service sought to be accessed, $SERVICE-ENABLE_X$. If the service is enabled, the access attempt proceeds. Otherwise, the mobile station waits a random period before attempting to initiate access again.

Prioritization of system access in the single Access Channel configuration is achieved through the selection of appropriate contention rate thresholds for each of the services Ski using the system. The contention rate thresholds are parameters selected by the cellular provider.

Figure 2A:
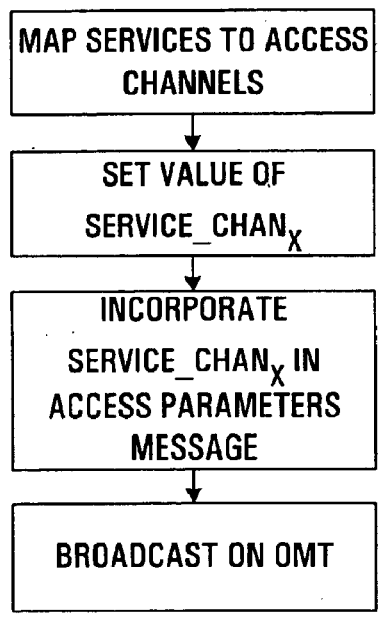
FIG. 2A is a flow-chart of the steps carried out at a base station for implementing a multiple Access Channel configuration in the uplink direction.
Figure 2B:
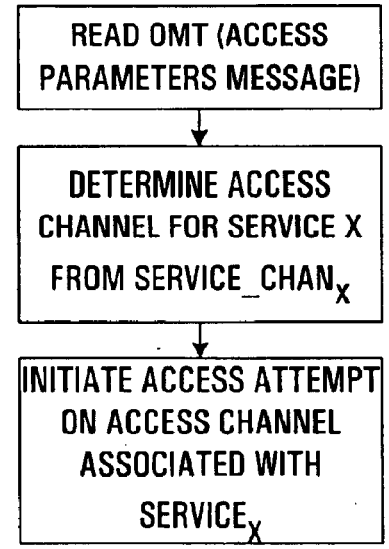
FIG. 2B is a flow-chart of the steps carried out at a mobile station for implementing a multiple Access Channel configuration in the uplink direction.

The implementation of the invention where multiple Access Channels have been configured is depicted in FIGS. 2A and 2B. The base station broadcasts an Access Parameters Message which includes service parameters, $SERVICE\_CHAN_X$, configured according to a predetermined service-to-Access Channel mapping. Each mobile station reads the Access Parameters Message and stores in memory the value of the service parameters. Prior to initiating an access attempt, the mobile station checks the service parameter for the service sought to be accessed, $SERVICE\_CHAN_X$. The mobile station sends its Access Message on one of the Access Channels which has been assigned to the service sought to be accessed by the mobile station.

Prioritization of system access in the multiple Access Channel configuration is achieved through the selection of an appropriate service-to-Access Channel mapping. The service-to-Access Channel mapping is selected by the cellular provider.

Other implementations or combinations of the single Access Channel and multiple Access Channel configurations are possible.

Figure 3A:
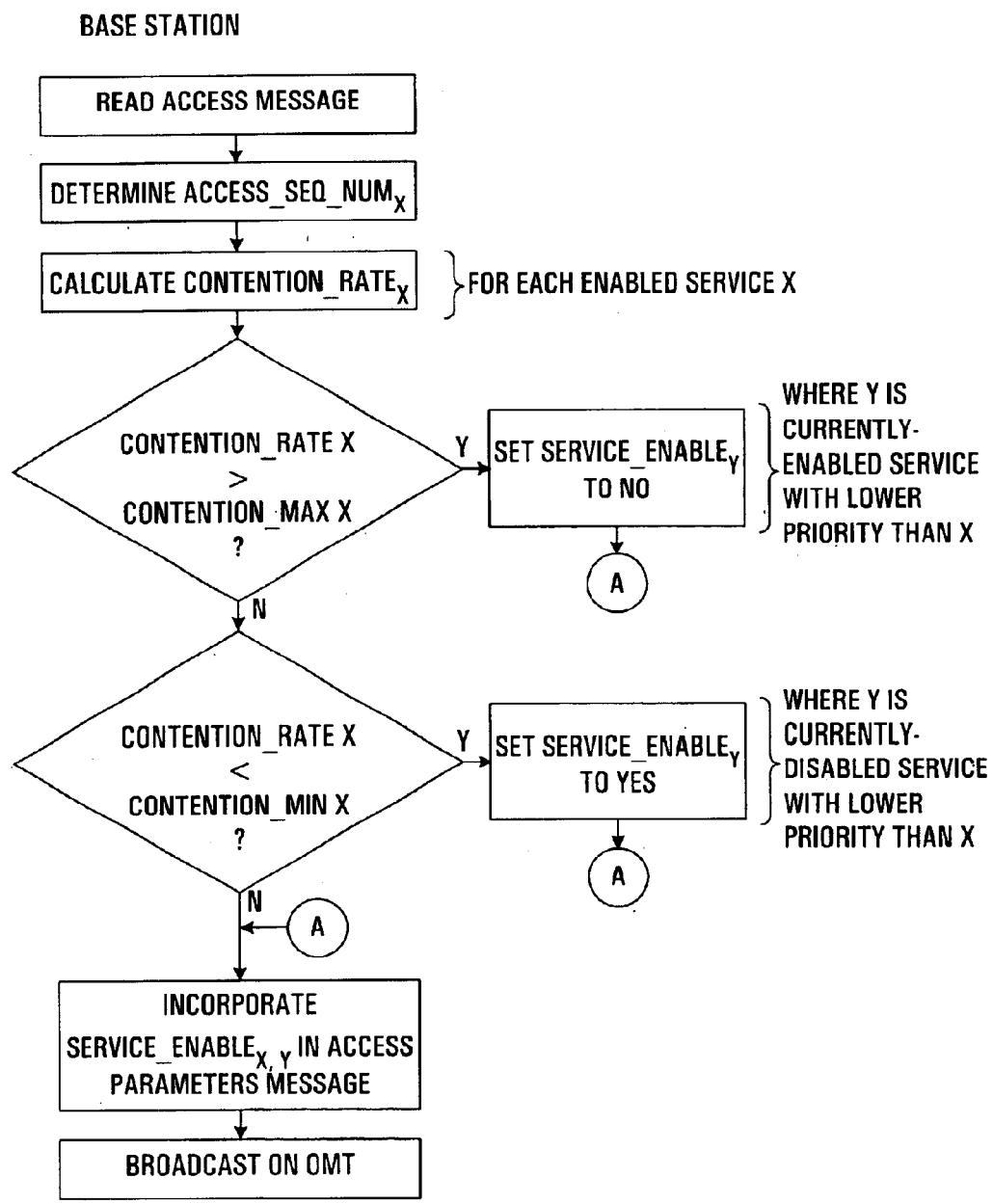
FIG. 3A is a flow-chart of the steps carried out at a base station for implementing a single Access Channel configuration in the uplink direction where the contention rate is calculated for each service, and services are prioritized with respect to each other.
Figure 3B:
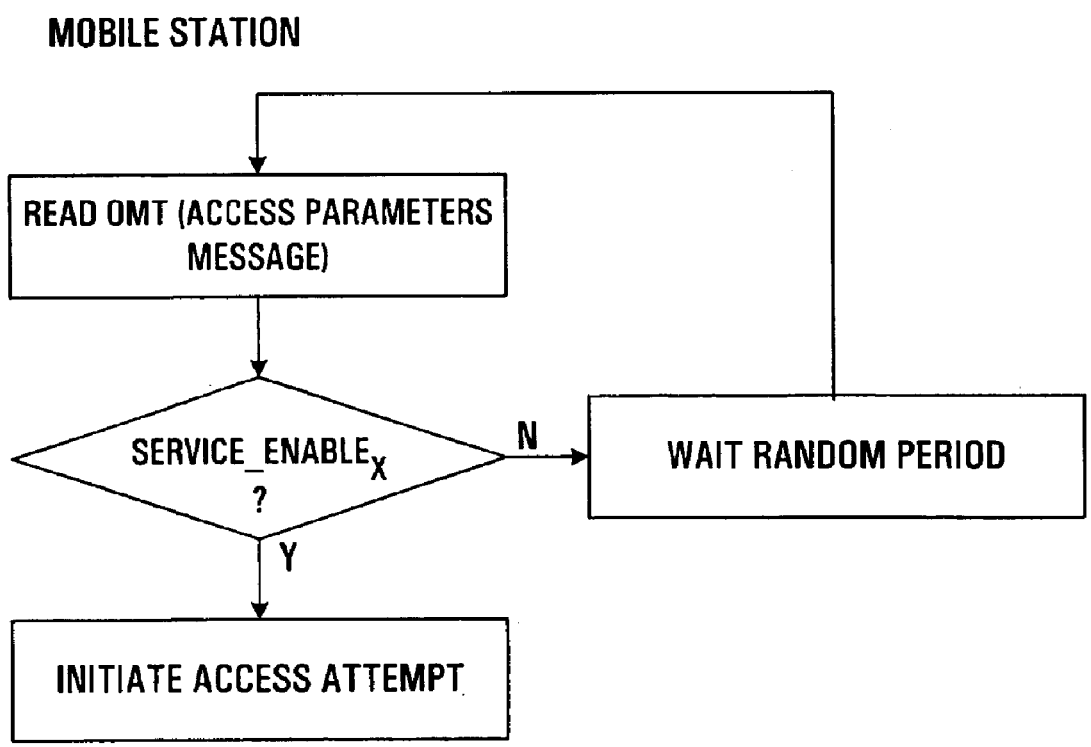
FIG. 3B is a flow-chart of the steps carried out at a mobile station for implementing a single Access Channel configuration in the uplink direction where the contention rate is calculated for each service, and services are prioritized with respect to each other.

For example, in the single Access Channel configuration, the contention rate can be calculated for each service using the system. Such an implementation is depicted in FIGS. 3A and 3B. First, the base station reads the Access Messages transmitted on the Access Channel and determines the value of a collision rate parameter, $ACCESS\_SEQ\_NUM_X$, representing the number of consecutive unsuccessful access sequences which have been initiated by the mobile stations seeking to initiate access for service X. The base station then establishes a service contention rate, $CONTENTION\_RATE_X$, for each service enabled within the system based upon the collision information received from all Access Channels configured in the system. For each such enabled service X, $CONTENTION\_RATE_X$ is compared to a predetermined maximum contention rate threshold for the given service, $CONTENTION\_MAX_X$. If the contention rate exceeds the maximum contention rate threshold for service X, the service parameter for one or more services Y, $SERVICE\_ENABLE_Y$ is set to NO, where Y is a currently-enabled service with a lower priority than service X.

If the contention rate does not exceed the maximum contention rate threshold for service X, the contention rate is compared to the minimum contention rate threshold for the given service, $CONTENTION\_MIN_X$. If the contention rate is below the minimum contention rate threshold for service X, the service parameter for one or more services Y, $SERVICE\_ENABLE_Y$ is set to YES, where Y is a currently-disabled service with a lower priority than service X. As described above, the service parameters are incorporated in the Access Parameters Message and broadcast to all mobile stations in the cell on the Overhead Message Train.

Figure 4A:
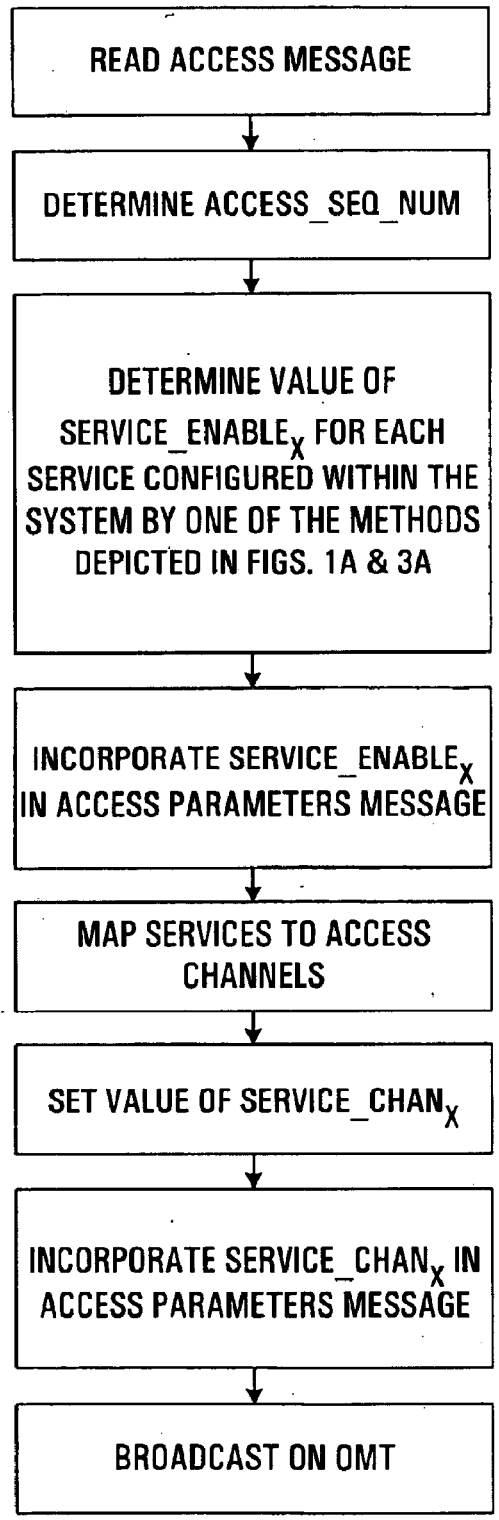
FIG. 4A is a flow-chart of the steps carried out at a base station for implementing a multiple Access Channel configuration in the uplink direction, where contention rates are used to enable/disable services.
Figure 4B:
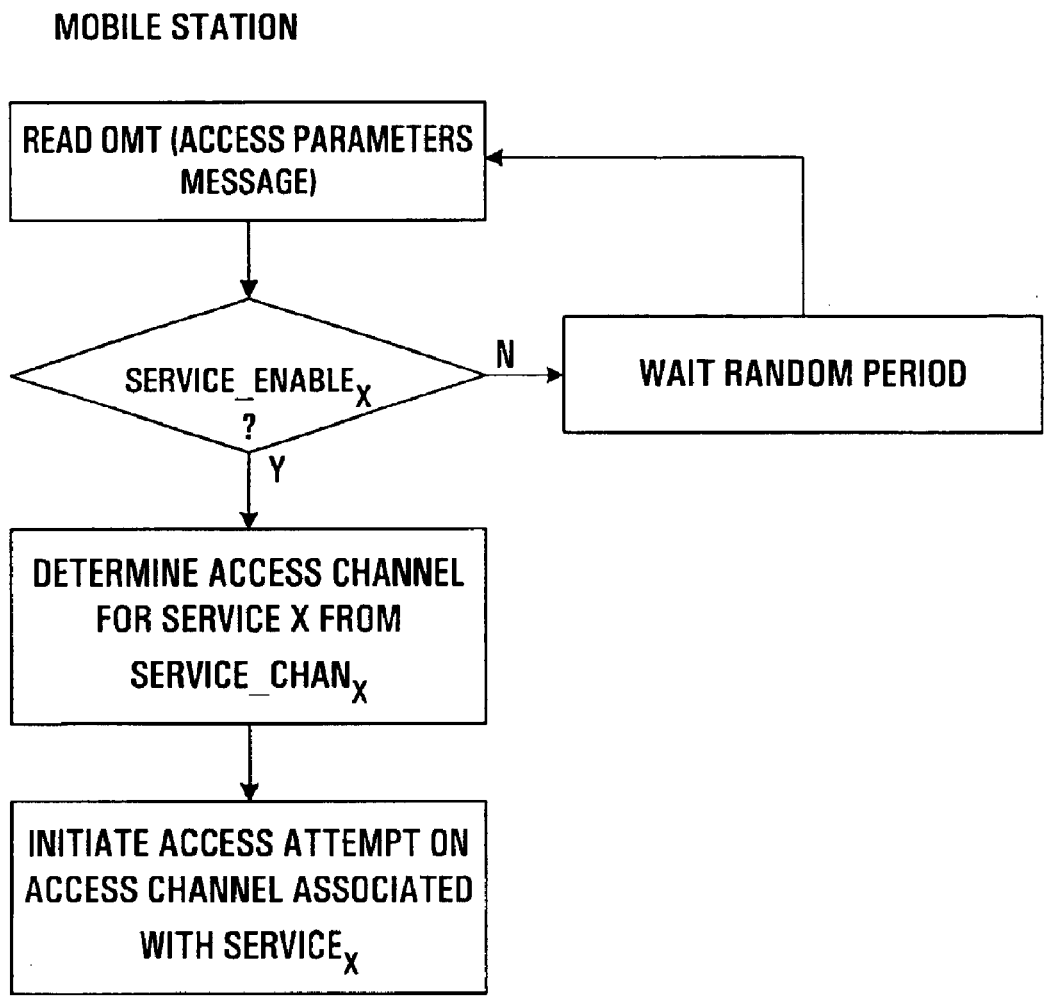
FIG. 4B is a flow-chart of the steps carried out at a mobile station for implementing a multiple Access Channel configuration in the uplink direction, where contention rates are used to enable/disable services.

As another example, collision rates and multiple Access Channels can be used together. Such an implementation is depicted in FIGS. 4A and 4B. Using one of the methods described above, the base station establishes the service parameters, $SERVICE\_ENABLE_X$, for each service, X, using the collision information derived from the Access Messages received on each Access Channel. Additionally, the value of service parameters, $SERVICE\_CHAN_X$, are determined for each service, X, according to a predetermined service-to-Access Channel mapping. The service parameters are incorporated in the Access Parameters Message and broadcast to all mobile stations in the cell on the Overhead Message Train. Each mobile station reads the Access Parameters Message and stores in memory the value of the service parameters. Prior to initiating an access attempt, the mobile station checks the service parameters for the service sought to be accessed, SERVICE ENABLE_and $SERVICE\_CHAN_X$. If the service is enabled, the access attempt proceeds on an Access Channel as provided by $SERVICE\_CHAN_X$. Otherwise, the mobile station waits a random period before attempting to initiate access again.

As yet another example, the base station can determine $SERVICE\_CHAN_X$ dynamically according to the loading of the Access Channels configured within the system.

In the downlink direction, two possible embodiments will be discussed; a single Paging Channel configuration and a multiple Paging Channel configuration.

Figure 5:
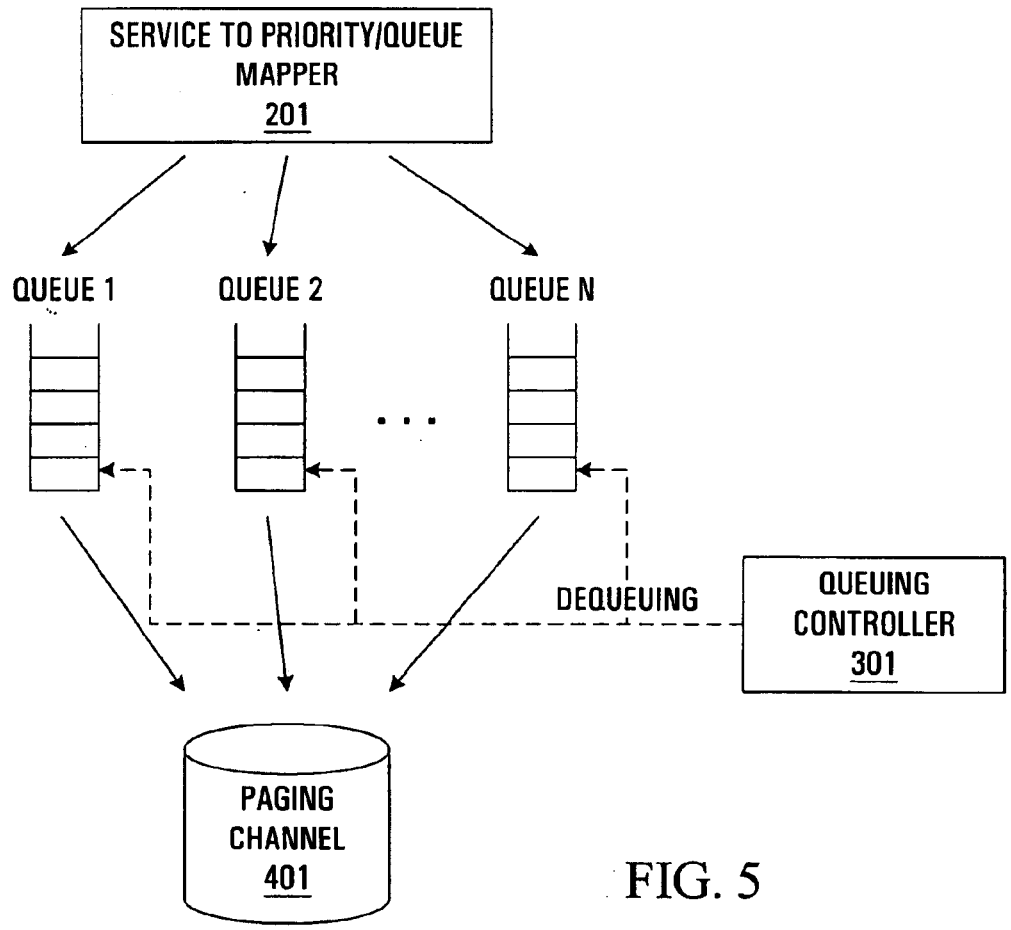
FIG. 5 is a schematic representation of a single Paging Channel Configuration in the downlink direction with prioritized services.

The procedure to be followed for incoming communications in the single Paging Channel configuration is depicted in FIG. 5. A plurality of queues, Q1 to QN, are established corresponding to individual services or groups of services with the same priority. Page attempts relating to different services are assigned to the appropriate queue by a Services to Priority/Queue Mapper 201. Dequeuing is performed by a Queuing Controller 301. Dequeued pages are sent on the single Paging Channel 401.

When a page request is received, the Service to Priority/Queue Mapper 201 determines the priority to be assigned to the page request based on the service requested. The Service to Priority/Queue Mapper then assigns the page request to the appropriate queue. The Queuing Controller 301 dequeues the page requests from the queues Q1 to QN according to a predetermined dequeuing algorithm. Dequeued pages are sent on the single Paging Channel 401.

Prioritization of the system pages is achieved through selection of an appropriate service-to-queue mapping, and an appropriate dequeuing algorithm. The service-to-queue mapping, and the dequeuing algorithm are parameters selected by the cellular provider. These parameters may be configured so that the page requests of higher priority services always pre-empt the page requests of lower priority services or, alternatively, so that the page requests of lower priority services are provided a specified level of fairness in relation to the page requests of higher priority services.

Figure 6:
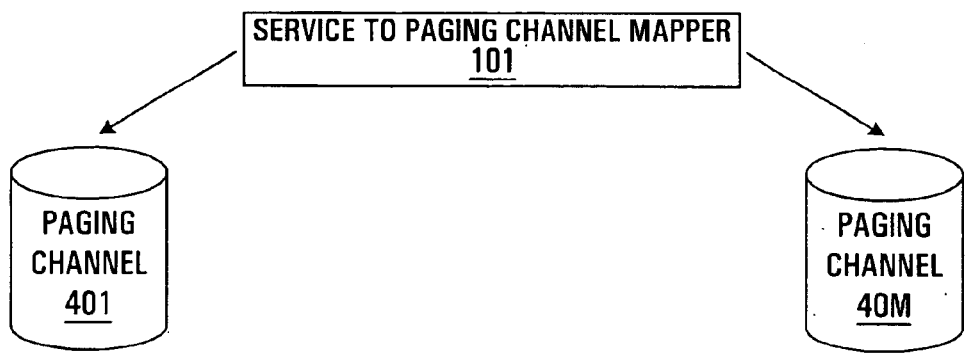
FIG. 6 is a schematic representation of a multiple Paging Channel Configuration in the downlink direction with services segregated across Paging Channels and first-in, first-out processing of page requests at each Paging Channel.

The implementation of the invention where multiple Paging Channels have been configured is depicted in FIG. 6.

When a page request is received, the Service to Paging Channel Mapper 101 determines the Paging Channel to be assigned to the page request based on the priority of the service requested. The Service to Paging Channel Mapper then assigns the page request to one of Paging Channels 401 to 40M. Page requests are processed at each Paging Channel on a first-in, first-out basis.

In the multiple Paging Channel configuration, prioritization of the system pages is achieved through selection of an appropriate service-to-Paging Channel mapping. The appropriate service-to-Paging Channel mapping is selected by the cellular provider.

Other implementations or combinations of the single Paging Channel and multiple Paging Channel configurations are possible.

Figure 7:
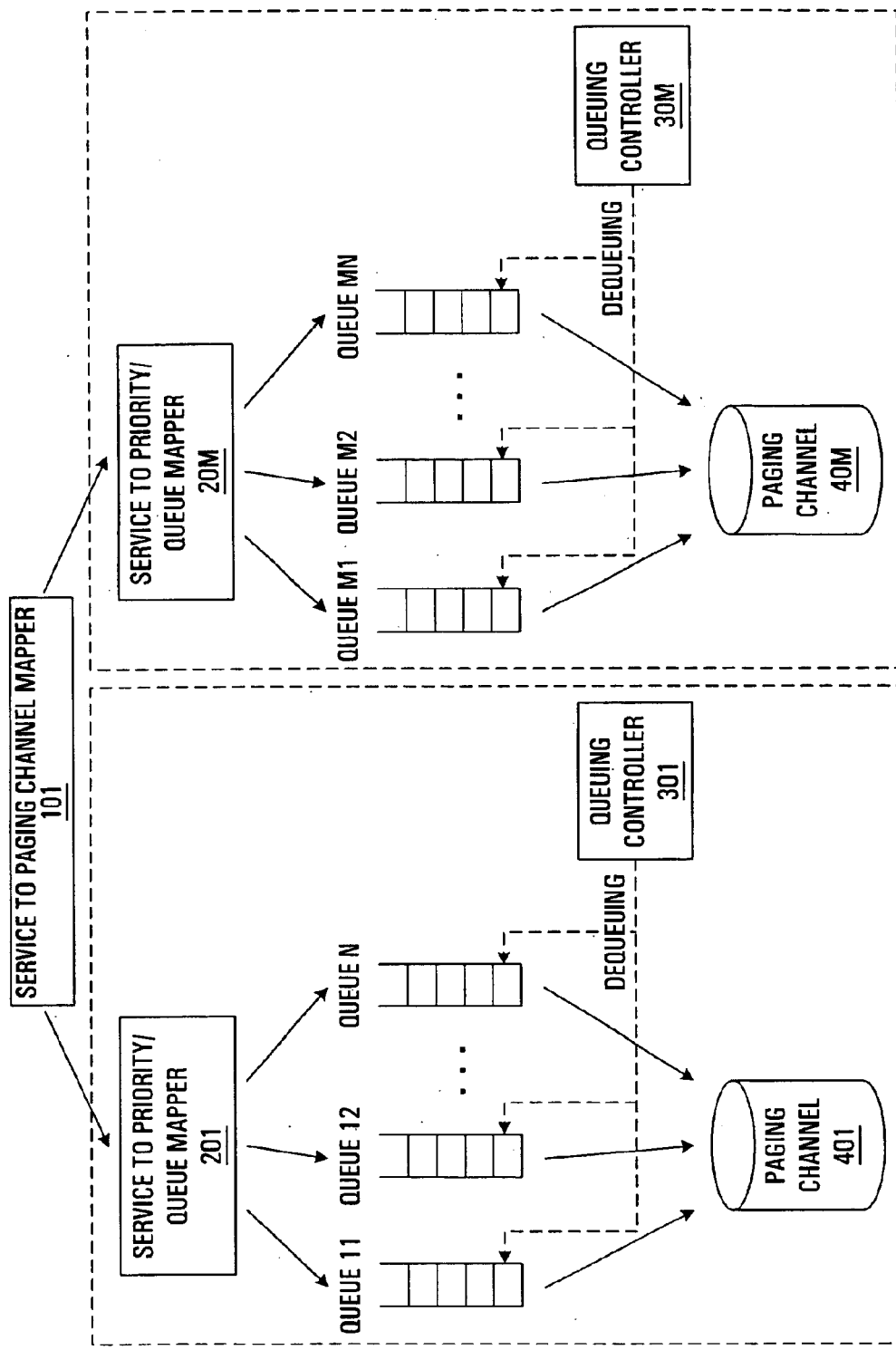
FIG. 7 is a schematic representation of a multiple Paging Channel configuration in the downlink direction with services segregated across Paging Channels and prioritized services within each Paging Channel.

For example, page queues and multiple Paging Channels can be used together. Such an implementation is depicted in FIG. 7. When a page request is received, Service to Paging Channel Mapper 101 assigns page requests from groups of services to one of Paging Channels 401 to 40M. For each Paging Channel, the Service to Priority/Queue Mapper (one of 201 to 20M) determines the priority to be assigned to the page request based on the service requested. The Service to Priority/Queue Mapper then assigns the page request to the appropriate queue. The Queuing Controller (one of 301 to 30M) dequeues the page requests from the queues QM1 to QMN according to a predetermined dequeuing algorithm. Dequeued pages are sent on Paging Channels 401 to 40M.

Figure 8:
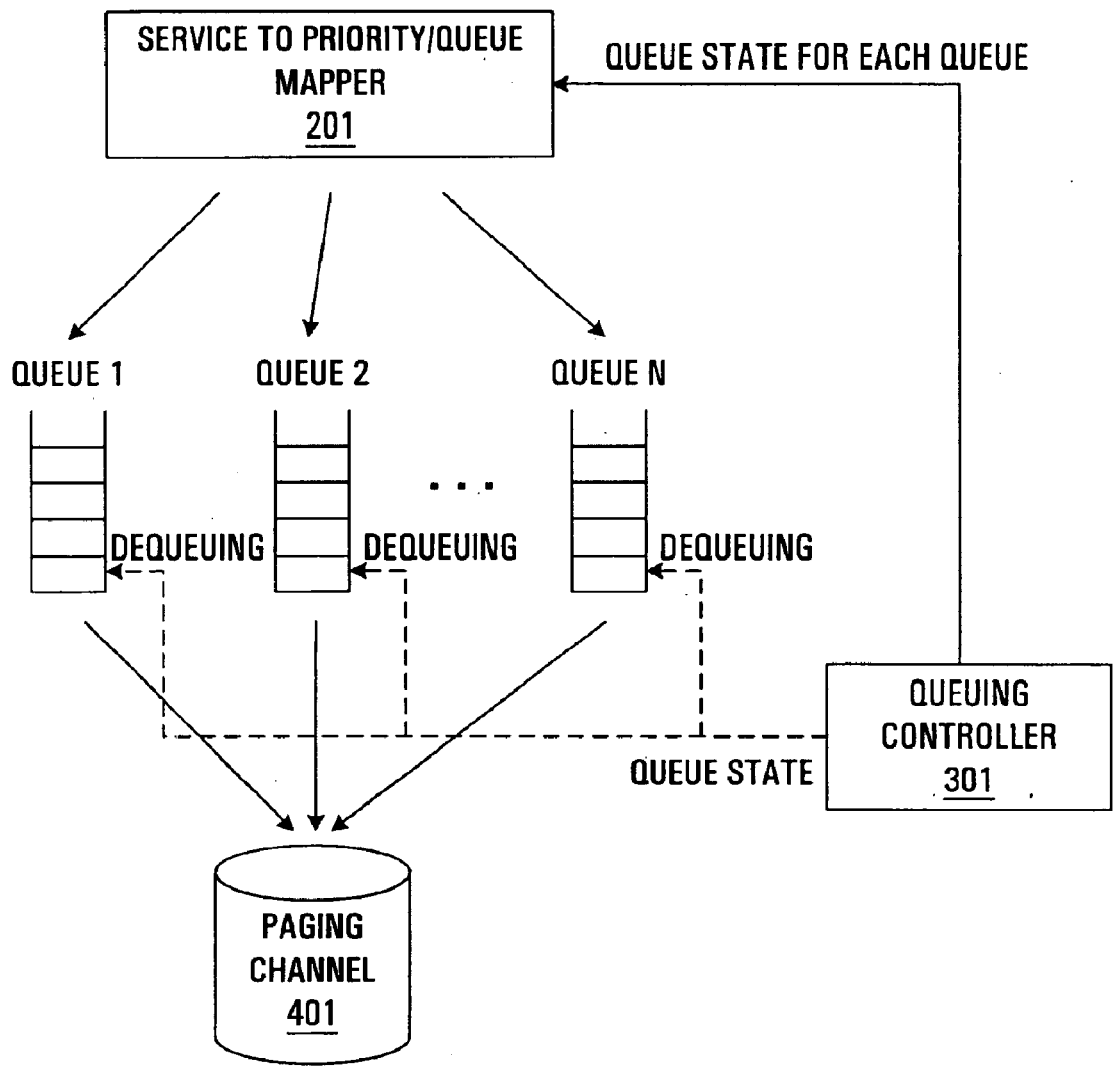
FIG. 8 is a schematic representation of a single Paging Channel configuration in the downlink direction with prioritized services incorporating feedback of the current state of the queues.

As yet another example, the Service to Priority/Queue Mapper 201 and the Queuing Controller 301 can be configured to dynamically change the service-to-queue mappings and/or the dequeuing algorithm based on the current state of queues Q1 to QN. The current state of the queues is fed back to the Queuing Controller 301 and the Service to Priority/Queue Mapper 301. Such an implementation is depicted in FIG. 8.

Figure 9:
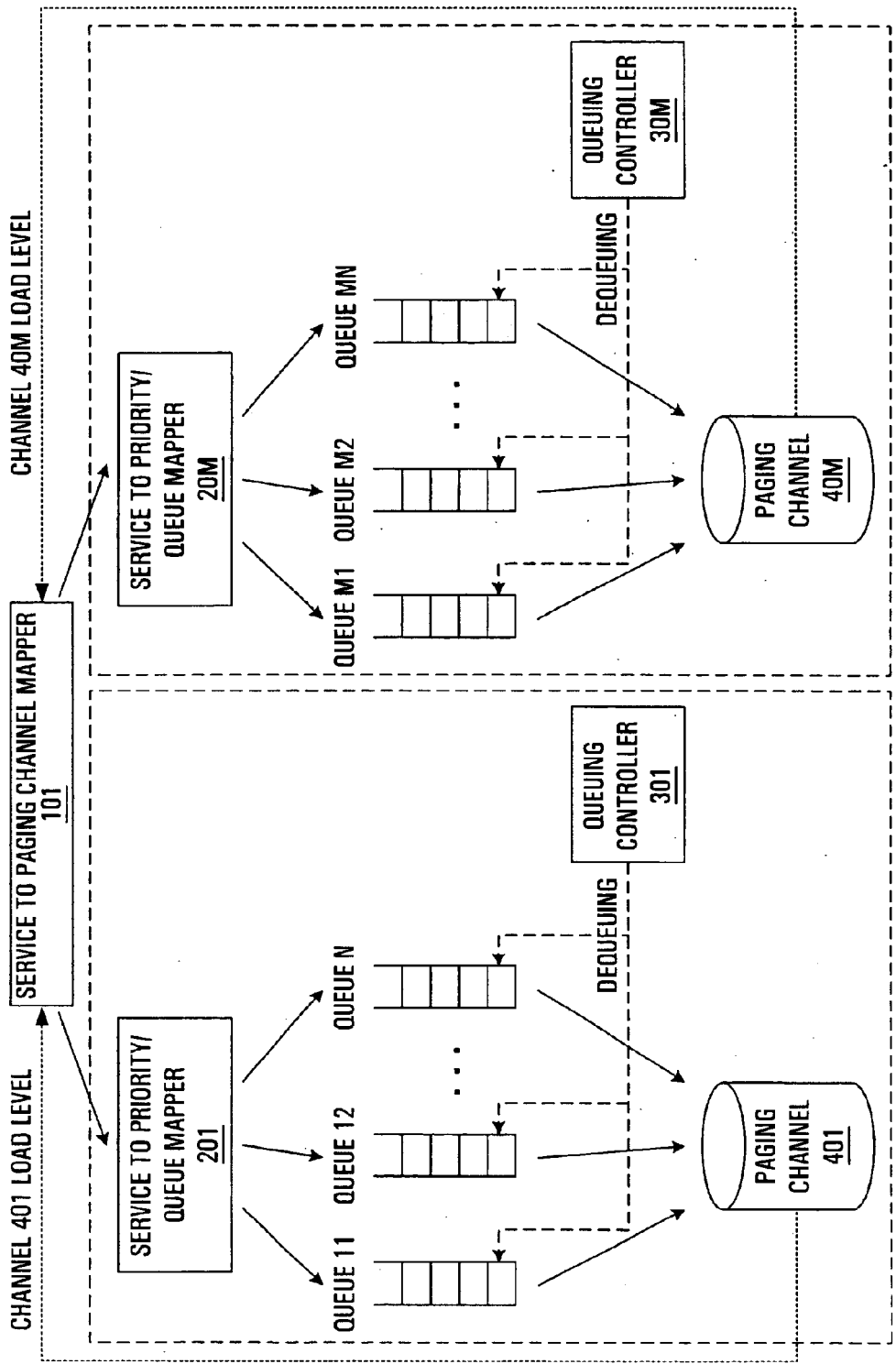
FIG. 9 is a schematic representation of a multiple Paging Channel configuration in the downlink direction with prioritized services incorporating feedback of the loading of the Paging Channels.

As yet another example, in the multiple Paging Channel configuration, the Service to Paging Channel Mapper 101 is configured to dynamically assign individual services or groups of services to Paging Channels 401 to 40M on the basis of the loading of the Paging Channels. The loading of each of the Paging Channels is fed back to the Service to Paging Channel Mapper 101. In this way, higher priority services may be assigned to the least-loaded Paging Channels. Such an implementation is depicted in FIG. 9.

Figure 10:
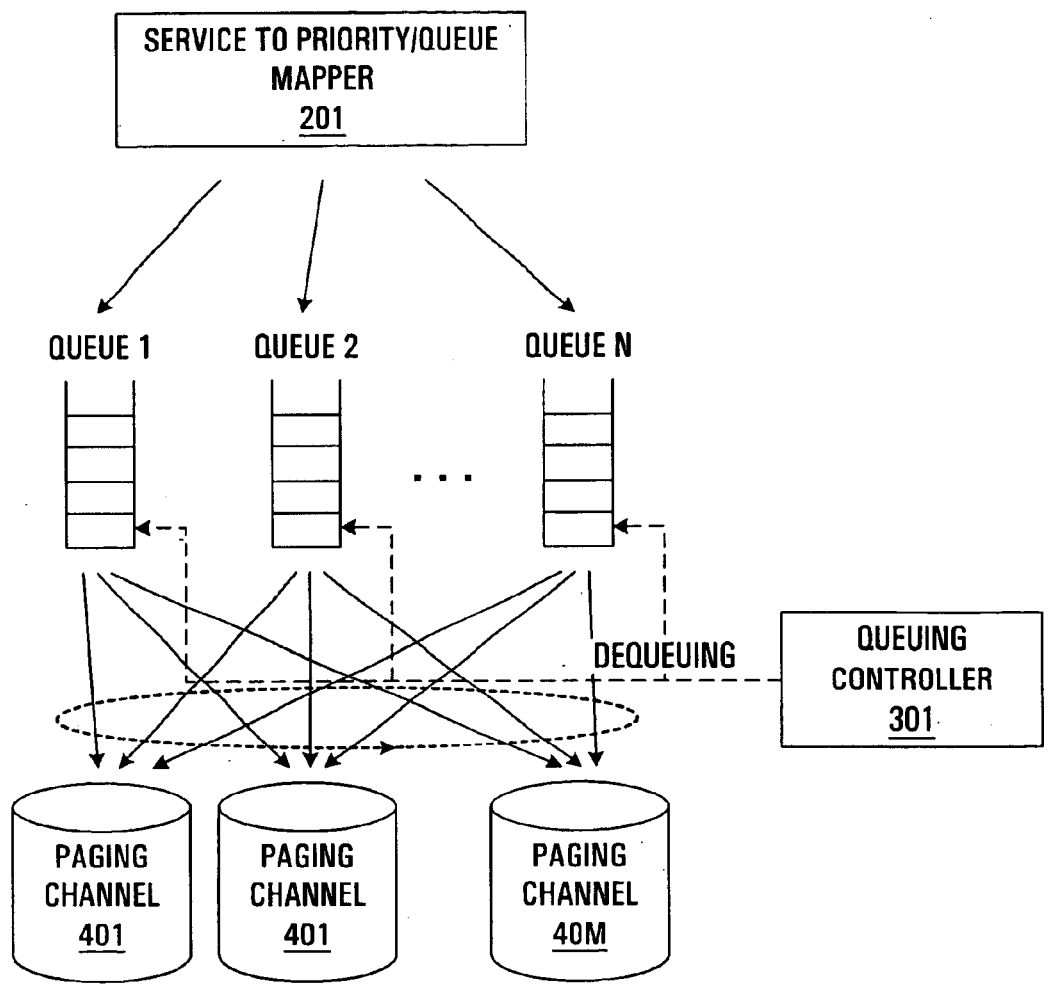
FIG. 10 is a schematic representation of an alternative multiple Paging Channel configuration in the downlink direction with prioritized services.

An alternative implementation of the invention using queues and multiple Paging Channels is depicted in FIG. 10. When a page request is received, the Service to Priority/Queue Mapper 201 determines the priority to be assigned to the page based on the service requested. The Service to Priority/Queue Mapper then assigns the page request to the appropriate queue. The Queuing Controller 301 dequeues the page requests from the queues Q1 to QN according to a predetermined dequeuing algorithm, and sends the pages on Paging Channels 401 to 40M. Illustratively, the dequeued pages may be sent on Paging Channels 401 to 40M in round-robin fashion.

As yet another example, the system determines which services are currently enabled by one of the methods described above in the discussion of mobile station-initiated communications. If the service with which the page request is associated is disabled, transmission of a page is inhibited.

It will be apparent to those skilled in the art that various modifications and variations can be made to the algorithm of the present invention without departing from the spirit or scope of the invention. Thus, it is intended that the present invention cover the modifications and variations of this invention provided they come within the scope of the appended claims and their equivalents.

What is claimed is:

1. In a cellular communication system comprising at least one base station and a plurality of mobile stations, wherein a single access channel is configured, a method for providing prioritized access to the communications system comprising the steps of:

(a) for each mobile station desiring access to the system, transmitting an access message which includes a collision rate parameter representing the number of consecutive unsuccessful access attempts which have been initiated by the mobile station;

(b) receiving at the base station said access message including the collision rate parameter;

(c) calculating from the collision rate parameters received from all mobile stations service parameters representing which services within the system are currently enabled;

(d) broadcasting from the base station a message including said service parameters;

(e) receiving said message including the service parameters at a mobile station desiring to access the system;

(f) comparing within the mobile station the service parameters with the service sought to be accessed; and (g) inhibiting the transmission of an access attempt if the service sought to be accessed has been disabled.

2. A method as set forth in claim 1 wherein the service parameters representing which services within the system are currently enabled are established by:

(a) calculating from the collision rate parameters received from all mobile stations a contention rate parameter representing the collision rate for the system; and (b) for each service accessing the system, comparing the contention rate parameter to a predetermined contention rate threshold for the service; and disabling services for which the contention rate parameter exceeds the contention rate threshold for the service.

3. A method as set forth in claim 1 wherein the service parameters representing which services within the system are currently enabled are established by:

for each enabled service accessing the system, (a) calculating from the collision rate parameters received from all mobile stations a service contention rate parameter representing the collision rate for that service;

(b) where the service contention rate parameter exceeds a pre-determined maximum contention rate threshold for the service, disabling one or more currently-enabled services with a lower priority; and (c) where the service contention rate parameter is below a predetermined minimum contention rate threshold for the service, enabling one or more currently-disabled services with a lower priority.

4. In a cellular communication system comprising at least one base station and a plurality of mobile stations, wherein a plurality of access channels are configured, a method for providing prioritized access to the communications system comprising the steps of:

(a) broadcasting from the base station a message including service parameters configured according to a pre-determined service-to-access channel mapping;

(b) receiving said message including the service parameters at a mobile station desiring to access the system;

(c) comparing within the mobile station said service parameters with the service sought to be accessed;

(d) determining the access channels to be used with the service sought to be accessed; and (e) transmitting an access attempt on one of the access channels determined in step (d).

5. A method as set forth in claim 4 wherein the service-to-access channel mapping is determined dynamically according to the loading of the access channels configured within the system.

6. In a cellular communication system comprising at least one base station and a plurality of mobile stations, wherein a plurality of access channels are configured, a method for providing prioritized access to the communications system comprising the steps of:

(a) for each mobile station desiring access to the system, transmitting an access message which includes a collision rate parameter representing the number of consecutive unsuccessful access attempts which have been initiated by the mobile station;

(b) receiving at the base station said access message including the collision rate parameter, (c) calculating from the collision rate parameters received from all mobile stations service parameters representing which services within the system are currently enabled, and incorporating a predetermined service-to-access channel mapping;

(d) broadcasting from the base station a message including said service parameters;

(e) receiving said message including the service parameters at a mobile station desiring to access the system;

(f) comparing within the mobile station the service parameters with the service sought to be accessed;

(g) inhibiting the transmission of an access attempt if the service sought to be accessed has been disabled; and (h) for services which are enabled, determining from the service parameters the access channels to be used with the service sought to be accessed and transmitting an access attempt on one of said access channels.

7. A method as set forth in claim 6 wherein the service-to-access channel mapping is determined dynamically according to the loading of the access channels configured within the system.

8. A method of operating a cellular communication system comprising at least one base station and a plurality of mobile stations, the method comprising the steps of:

(a) for each mobile station desiring access to the system, transmitting an access message which includes a collision rate parameter representing the number of consecutive unsuccessful access attempts which have been initiated by the mobile station;

(b) receiving at the base station said access message including the collision rate parameter;

(c) calculating from the collision rate parameters received from all mobile stations service parameters representing which services within the system are currently enabled; and (d) inhibiting the transmission of a page if the service sought to be accessed has been disabled.

9. A cellular communication system comprising at least one base station and a plurality of mobile stations, wherein a single access channel is configured, the system comprising:

(a) for each mobile station desiring access to the system, means for transmitting an access message which includes a collision rate parameter representing the number of consecutive unsuccessful access attempts which have been initiated by the mobile station;

(b) means for receiving at the base station said access message including the collision rate parameter, (c) means for calculating from the collision rate parameters received from all mobile stations service parameters representing which services within the system are currently enabled;

(d) means for broadcasting from the base station a message including said service parameters;

(e) means for receiving said message including the service parameters at a mobile station desiring to access the system;

(f) means for comparing within the mobile station the service parameters with the service sought to be accessed; and (g) means for inhibiting the transmission of an access attempt if the service sought to be accessed has been disabled.

10. A system as set forth in claim 9, wherein the means for calculating the service parameters representing which services within the system are currently enabled comprise:

(a) means for calculating from the collision rate parameters received from all mobile stations a contention rate parameter representing the collision rate for the system; and (b) for each service accessing the system, means for comparing the contention rate parameter to a pre-determined contention rate threshold for the service; and means for disabling services for which the contention rate parameter exceeds the contention rate threshold for the service.

11. A system as set forth in claim 9, wherein the means for calculating the service parameters representing which services within the system are currently enabled comprise:

for each enabled service accessing the system, (a) means for calculating from the collision rate parameters received from all mobile stations a service contention rate parameter representing the collision rate for that service;

(b) where the service contention rate parameter exceeds a pre-determined maximum contention rate threshold for the service, means for disabling one or more currently-enabled services with a lower priority; and (c) where the service contention rate parameter is below a pre-determined minimum contention rate threshold for the service, means for enabling one or more currently-enabled services with a lower priority.

12. A cellular communication system comprising at least one base station and a plurality of mobile stations, wherein a plurality of access channels are configured, the system comprising:
   (a) means for broadcasting from the base station a message including service parameters configured according to a predetermined service-to-access channel mapping;
   (b) means for receiving said message including the service parameters at a mobile station desiring to access the system;
   (c) means for comparing within the mobile station said service parameters with the service sought to be accessed;
   (d) means for determining the access channels to be used with the service sought to be accessed; and
   (e) means for transmitting an access attempt on one of the access channels determined in step (d).

13. A system as set forth in claim 12 wherein the service-to-access channel mapping is determined dynamically according to the loading of the access channels configured within the system.

14. A cellular communication system comprising at least one base station and a plurality of mobile stations, wherein a plurality of access channels are configured, the system comprising:
   (a) for each mobile station desiring access to the system, means for transmitting an access message which includes a collision rate parameter representing the number of consecutive unsuccessful access attempts which have been initiated by the mobile station;
   (b) means for receiving at the base station said access message including the collision rate parameter,
   (c) means for calculating from the collision rate parameters received from all mobile stations service parameters representing which services within the system are currently enabled, and incorporating a pre-determined service-to-access channel mapping;
   (d) means for broadcasting from the base station said message including said service parameters;
   (e) means for receiving said message including the service parameters at a mobile station desiring to access the system;
   (f) means for comparing within the mobile station the service parameters with the service sought to be accessed;
   (g) means for inhibiting the transmission of an access attempt if the service sought to be accessed has been disabled; and
   (h) for services which are enabled, means for determining from the service parameters the access channels to be used with the service sought to be accessed and means for transmitting an access attempt on one of said access channels.

15. A system as set forth in claim 14 wherein the service-to-access channel mapping is determined dynamically according to the loading of the access channels associated with each paging channel configured within the system.

16. A cellular communication system comprising at least one base station and a plurality of mobile stations, the system comprising:
   (a) for each mobile station desiring access to the system, means for transmitting an access message which includes a collision rate parameter representing the number of consecutive unsuccessful access attempts which have been initiated by the mobile station;
   (b) means for receiving at the base station said access message including the collision rate parameter;
   (c) means for calculating from the collision rate parameters received from all mobile stations service parameters representing which services within the system are currently enabled; and
   (d) means for inhibiting the transmission of a page if the service sought to be accessed has been disabled.

17. A computer-readable medium for a base station of a cellular communication system which also includes a plurality of mobile stations, wherein a single access channel is configured, the computer-readable medium having stored instructions for:
   (a) receiving at the base station an access message from each mobile station desiring access to the system which includes a collision rate parameter representing the number of consecutive unsuccessful access attempts which have been initiated by the mobile station;
   (b) calculating from the collision rate parameters received from all mobile stations service parameters representing which services within the system are currently enabled; and
   (c) broadcasting from the base station a message including said service parameters.

18. A computer-readable medium according to claim 17 wherein the service parameters representing which services within the system are currently enabled are established by:
   (a) calculating from the collision rate parameters received from all mobile stations a contention rate parameter representing the collision rate for the system; and
   (b) for each service accessing the system,
   comparing th e contention rate parameter to a pre-determined contention rate threshold for the service; and
   disabling services for which the contention rate parameter exceeds the contention rate threshold for the service.

19. A computer-readable medium according to claim 17 wherein the service parameters representing which services within the system are currently enabled are established by:
   for each enabled service accessing the system,
      (a) calculating from the collision rate parameters received from all mobile stations a service contention rate parameter representing the collision rate for that service;
      (b) where the service contention rate parameter exceeds a pre-determined maximum contention rate threshold for the service, disabling one or more currently-enabled services with a lower priority; and
      (c) where the service contention rate parameter is below a pre-determined minimum contention rate threshold for the service, enabling one or more currently-disabled services with a lower priority.

20. A computer-readable medium for a base station of a cellular communication system which also includes a plurality of mobile stations, wherein a plurality of access channels are configured, the computer-readable medium having stored instructions for:
   (a) receiving at the base station an access message from each mobile station desiring access to the system which includes a collision rate parameter representing the number of consecutive unsuccessful access attempts which have been initiated by the mobile station;

(b) calculating from the collision rate parameters received from all mobile stations service parameters representing which services wit the system are currently enabled, and incorporating a pre-determined service-to-access channel mapping;

(c) broadcasting from the base station a message including the service parameters.

21. A computer-readable medium according to claim 20 wherein the service-to-access channel mapping is determined dynamically according to the loading of the access channels configured within the system.

22. A computer-readable medium for a base station of a cellular communication system which also includes a plurality of mobile stations, the computer-readable medium having stored instructions for:

(a) receiving at the base station an access message from each mobile station desiring access to the system which includes a collision rate parameter representing the number of consecutive unsuccessful access attempts which have been initiated by the mobile station;

(b) calculating from the collision rate parameters received from all mobile stations service parameters representing which services within the system are currently enabled; and (c) inhibiting the transmission of a page if the service sought to be accessed has been disabled.

23. A computer-readable medium for a mobile station of a cellular communication system which also includes at least one base station, wherein a single access channel is configured, the computer-readable medium having stored instructions for:

(a) transmitting an access message which includes a collision rate parameter representing the number of consecutive unsuccessful access attempts which have been initiated by the mobile station;

(b) receiving a message generated by the base station which includes service parameters representing which services within the system are currently enabled;

(c) comparing within the mobile station the service parameters with the service sought to be accessed; and (d) inhibiting the transmission of an access attempt if the service sought to be accessed has been disabled.

24. A computer-readable medium for a mobile station of a cellular communication system which also includes at least one base station, wherein a plurality of access channels are configured, the computer-readable medium having stored instructions for:

(a) receiving a message generated by the base station which includes service parameters configured according to a pre-determined service-to-access channel mapping;

(b) comparing within the mobile station said service parameters with the service sought to be accessed;

(c) determining the paging channels to be used with the service sought to be accessed; and (d) transmitting an access attempt on one of the access channels determined in step (c).

25. A computer-readable medium for a mobile station of a cellular communication system which also includes at least one base station, wherein a plurality of paging channels are configured, the computer-readable medium having stored instructions for:

(a) transmitting an access message which includes a collision rate parameter representing the number of consecutive unsuccessful access attempts which have been initiated by the mobile station;

(b) receiving a message generated by the base station which includes service parameters representing which services within the system are currently enabled and incorporating a pre-determined service-to-access channel mapping;

(c) comparing within the mobile station the service parameters with the service sought to be accessed;

(d) inhibiting the transmission of an access attempt if the service sought to be accessed has been disabled; and (e) for services which are enabled, determining from the service parameters the access channels to be used with the service sought to be accessed and transmitting an access attempt on one of said access channels.

* * * * *

UNITED STATES PATENT AND TRADEMARK OFFICE
CERTIFICATE OF CORRECTION

PATENT NO. : 6,859,440 B1
DATED : February 22, 2005
INVENTOR(S) : Jagdish Sonti et al.

It is certified that error appears in the above-identified patent and that said Letters Patent is hereby corrected as shown below:

<u>Title page,</u>
Item [75], Inventor, address for "Rasul Chaudry" should read -- Ottawa, (CA) --

<u>Column 13,</u>
Line 3, "... wit ..." should read -- ... within ... --

Signed and Sealed this

Nineteenth Day of July, 2005

JON W. DUDAS
*Director of the United States Patent and Trademark Office*